US006774836B2

(12) United States Patent
Frech et al.

(10) Patent No.: US 6,774,836 B2
(45) Date of Patent: Aug. 10, 2004

(54) METHOD FOR DELTA-NOISE REDUCTION

(75) Inventors: Roland Frech, Ostfildern (DE); Bernd Garben, Schoenaich (DE); Hubert Harrer, Schoenaich (DE); Andreas Huber, Holzgertingen (DE); Dierk Kaller, Schoenaich (DE); Erich Klink, Schoenaich (DE); Thomas-Michael Winkel, Schoenaich (DE); Wiren Dale Becker, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/462,529

(22) Filed: Jun. 16, 2003

(65) Prior Publication Data

US 2004/0051511 A1 Mar. 18, 2004

(30) Foreign Application Priority Data

Jun. 14, 2002 (EP) .......................................... 02013126

(51) Int. Cl.[7] ............................................ H04L 17/02
(52) U.S. Cl. ...................................... 341/173; 327/310
(58) Field of Search ......................... 341/173; 327/310, 327/379, 333

(56) References Cited

U.S. PATENT DOCUMENTS 6,683,485 B1 * 1/2004 Wert .......................... 327/333

* cited by examiner

*Primary Examiner*—Brian Young
*Assistant Examiner*—Joseph Lauture
(74) *Attorney, Agent, or Firm*—Floyd A. Gonzalez

(57) ABSTRACT

A method, digital circuit system and program product for reducing delta-I noise in a plurality of activity units connected to a common DC-supply voltage. In order to smooth the fluctuations (delta-I) of a total current demand I, and a respective resulting fluctuation of the supply voltage, a signalling scheme between said activity units and a supervisor unit which holds a system-specific "database" containing at least the current demand of each activity unit device when operating regularly. Dependent of the quantity of calculated, imminent delta-I a subset of said activity units with a respective current I demand is selected and controlled, for either temporarily delaying their beginning of activity in case of an imminent supply voltage drop, or temporarily continuing their activity with a predetermined, activity-specific NO-OP phase in case of an imminent supply voltage rise.

9 Claims, 3 Drawing Sheets

METHOD FOR DELTA-NOISE REDUCTION

BACKGROUND OF THE INVENTION

The present invention relates to design and operation of high-frequency clocked digital circuit systems, and in particular to method and system for reducing delta I-noise in said digital circuit system.

The operation speed of today's computer systems approach sub-nanosecond cycle times. The average switching activity and therefore the average power supply current I demand can fluctuate, i.e., change within few nanoseconds. E.g., delta-I=140A current fluctuation of the average power supply current is typical for the multiprocessor multi-chip module of the prior art IBM zSeries 900 system. The fluctuation of the average current demand can be periodic or non-periodic. Due to the parasitic inductance along the power distribution path from the power supply to the individual chips the on-chip power supply voltage deviates temporarily from its nominal level in reaction of a switching activity change. The expression "fluctuation" is used in here for denoting the rise or drop of a physical quantity, such as current I or supply voltage U, whereas the term "change" will be primarily used for denoting a status transition associated with a given activity unit on the chip, e.g., from "switching" to "quiet". These power supply voltage deviations are called high- and mid-frequency delta-I noise.

In order to reduce the power supply delta-I noise, decoupling capacitors are placed in prior art along the power supply path, on chips, modules, cards and boards. These decoupling capacitors can sink and source extra current and thus reduce the impact of delta-I on the power supply voltage. However, the decoupling capacitors and all parasitic partial inductance of the power supply path also create resonance loops having various resonance frequencies, which may increase the delta-I noise, if a resonance frequency and the frequency of a periodic switching change coincide. This prior art is described in H. B. Bakoglu, "Circuits, Interconnections, and Packaging for VLSI", Addison-Wesley Publishing Company, 1990, pp. 303–325, or in W. D. Becker, et al, "Modeling, Simulation and Measurement of Mid-Frequency Simultaneous Switching Noise in Computer Systems", *IEEE Trans. Compon., Packaging, and Manuf. Technol., Part B: Advanced Packaging*, vol. 21, no. 2, pp. 157–163, May 1998, or in D. Herrell, B. Beker, "Power system design for high performance PC microprocessors", IEEE International Workshop on Chip-Package Codesign CPD'98, pp. 46–47, 1998.

Delta-I noise is one contribution to the overall power supply noise budget and can jeopardize system function and reliability.

FIG. 1 is intended to illustrate the general problem. It shows the on-chip power supply noise voltage after starting operation, i.e., switching with 1 nanosecond (ns) cycle time, and 140A average power supply current, which represents a delta-I current step from 0 A to 140 A. The power supply voltage behavior has been obtained by simulation and confirmed by measurements, see B. Garben, M. F. McAllister, "Novel Methodology for Mid-Frequency Delta-I Noise Analysis of Complex Computer System Boards and Verification by Measurements", IEEE 9th Topical Meeting on Electrical Performance of Electronic Packaging, pp. 69–72, 2000. High frequency noise (1 ns period) and mid frequency noise (132 ns period) are superimposed. The actual on-chip power supply voltage behaves the same around the nominal voltage level (e.g. 1.2V).

The damped mid-frequency oscillation with initially 57 mV peak on-chip power supply voltage noise is caused by the resonant loop consisting of all on-module capacitors, i.e., on-module power supply decoupling capacitors plus capacitance of all chips, all board decoupling capacitors and the effective power supply path loop inductance between the two sets of capacitors.

With reference to Plot a) of FIG. 2 the on-chip power supply noise voltage of the same packaging arrangement is shown, but now, switching and non-switching depicted as "quiet"-time slots repeat every 66 ns. The delta-I repetition rate coincides with the package resonance of 132 ns. The peak on-chip power supply delta-I noise equals 74 mV during the 1st quiet time slot and increases to 103 mV during the 2nd quiet time slot. Both peak noise values exceed the 57 mV, seen during a single switching activity change. The peak mid-frequency on-chip power supply delta-I noise during periodic activity changes saturates at approx. 135 mV beyond 8 periods.

The saturated peak on-chip mid-frequency delta-I noise increases with increasing conductivity within the resonance loop. E.g. if the overall conductivity within the loop is doubled, the maximum on-chip noise reaches 202 mV after 10 periodic switching activity changes without any saturation tendency (FIG. 2, curve b). This example demonstrates how the peak on-chip power supply voltage noise of periodic/repeated activity changes can significantly exceed the peak values of a single activity change.

In prior art, high performance computer systems such as the IBM zSeries 900 apply the following technical features in order to damp the delta I-noise:

1. many decoupling capacitors on chips, on the Multi-Chip-Module (MCM) and on the board close to the MCM,
2. sandwiching of VDD and GND planes closely to each other, in cards and boards to provide a low effective power supply loop inductance.

However, these design efforts also reduce the effective resistance of the resonant loop and therefore increase the power supply delta-I noise sensitivity in case of a resonance condition.

Delta-I noise and its increase due to resonant effects is considered in the system noise budget and in signal timing calculations. The following two theoretical approaches are considered today to account for large non-periodic switching activity changes, whereas periodic activity changes are not regarded at all:

First, an increase of the chip operation voltage allowing shorter cycle times to avoid resonance. This, however, implies more power dissipation, which is not desired at all.

Second, stretching the system cycle time to avoid resonance. This however reduces the system performance, which also is not desired.

BRIEF SUMMARY OF THE INVENTION

It is thus an objective of the present invention to provide a method and system for reducing delta I-noise in digital circuit systems.

According to the broadest aspect of the present invention a method and respective system is disclosed in a general approach for reducing delta-I noise in a digital circuit system comprised of a plurality of activity units being connected to a DC-supply voltage, in which method and system respectively, the operation of said digital circuit system may excite high-frequency fluctuations of a total supply current I (delta-I), and a respective resulting fluctuation of the supply voltage. Said method is characterized by the steps of:

a) maintaining a circuit system-specific catalogue storing the current consumption and delta-I for each of said activity units in its operational state, b) continuously monitoring the actual current consumption of the total of said activity units, c) determining critical operation conditions to be caused by an immediately imminent excess fluctuation of the supply voltage resulting from an immediately imminent delta-I demand, the excess quantity being defined relative to a predetermined set tolerance band for the total current I, d) dependent of the quantity of the imminent delta-I demand selecting a subset of said activity units with a respective current delta-I demand, for either aa) temporarily delaying their begin of activity in case of an imminent supply voltage drop, or bb) temporarily continuing their activity with a predetermined, activity-specific No-Operation (NO-OP) phase in case of an imminent supply voltage rise.

During the physical system packaging design various power supply loop resonance frequencies (f_crit), the corresponding critical duty factor ranges (T=1/f_crit) and a maximum allowed single total delta-I demand (i_crit) value are determined by simulation and are coded into a system specific catalogue, i.e., “data base (SSDB)”, then the critical excess voltage states, i.e., dropdowns, and rise peaks, can be supervised and avoided.

According to the present invention, throughout the system all major power consuming sub-units, i.e., said activity units, referred to herein as AU, mentioned above, which might be one chip or portion of a chip, or a group of activity units, contain a control element, referred to herein as CE, for monitoring and controlling the actual switching activity within the unit. The control element can force switching activity start delays and NO-OP (dummy) cycles on request within the AU. According to the invention all control elements and thus all sub-units are coordinated by a supervising unit, referred to herein as SU, in a way, which avoids overall periodic switching activity changes of the above mentioned plurality of critical resonance frequencies f_crit and keeps non-periodic switching activity changes and thus delta-I values below i_crit.

According to the invention there may be basically one supervising unit throughout the system to coordinate the change of total power consumption, or the system is split into several power domains having several supervising units. The SU decisions are based on the system specific data base. The SU can grant AUs having an actually active state to switch into a “quiet” state and vice versa while keeping the overall system switching activity state change within particular predetermined bounds.

This basic controlling scheme is permanently used to control the delta-I power supply noise, in particular during system power-on, system test and during general system operation. This approach allows to operate systems, which would not be functional/reliable without this control.

The controlling scheme can also be used to guide the overall system activity to a mode where functional, delayed and NO-OP switching activities are interlaced or anti-cycled in a way, that the delta-I noise is actively damped. This is described in more detail below with reference to FIG. 5 curve b.

The above mentioned general approach thus basically needs:

a kind of supervisor unit performing steps a) to d) and communication between each AU and the supervisor unit which transfers the actual information ON/OFF for each activity unit. Thus, a damped delta-I-fluctuation behavior and thus a nearly constant supply voltage can be obtained over time.

Said general approach thus covers more than the more preferred particular request/grant approach which is a special case of the general approach. The delta in generality can be seen in the fact that the general approach includes solutions in which the AUs are treated as immediate command receivers, which must sometimes halt their operation even in cases in which this seems not adequate for sake of system performance.

The request grant approach assures that once an AU has begun operation it can continue operation until this is finished. Thus, a weaker intervention to the existing, finely balanced instruction handling in the chip circuit is done, which results in more performance compared to the general approach.

The basic method mentioned before, may be further improved, by further comprising a request/grant mechanism between a supervisor means and each of said activity units, whereby the mechanism comprises the steps of:

a) an activity unit requesting that its operation is required to begin (Go-request), b) granting the request when this is compliant to the predetermined tolerance band, otherwise not granting said request, c) on a successful grant, beginning operation of the AU, d) an activity unit requesting that operation is required to stop (STOP-request), e) granting the STOP-request when the respective stop of activity operation is compliant to the tolerance band, otherwise not granting said request, f) on a successful grant, stopping the operation of the AU.

Here, the advantage is that the degree of intervention with the actual operational (functional) chip logic is quite small which results in robust control and improved circuit performance.

In other words, a method is described to reduce delta-I noise and guarantee safe digital system operation despite of critically periodic switching activity changes and/or large non-periodic switching activity changes of CMOS chips, e.g. microprocessors, storage arrangements.

The system operation jeopardizing critical conditions are identified by simulation during the physical system packaging design. According to the invention, during system operation the actual switching activity is continuously monitored. In case of a critical, imminent condition built-up, i.e., an excess fluctuation can be identified to be immediately expected, then additional non-switching or switching cycles are executed to de-escalate the critical condition. This approach allows to build and operate systems, which would not be functional and reliable without this control.

The following structural features are disclosed:

A digital circuit system comprised of a plurality of activity units being connected to a DC-supply voltage, the operation of which may excite high-frequency fluctuations of a total current I, and a respective resulting fluctuation of the supply voltage, is characterized by digital circuit means implemented for performing the steps of the method mentioned before.

In particular, the digital circuit system may be preferably characterized by the facts that a) a subset of said activity units comprises a control element for issuing a STOP or GO request and for receiving a respective grant, whereby said grant triggers a begin and stop of operation of said activity units, b) a supervisor control circuit is connected to said control elements via respective control signal lines or other communication means.

When the digital circuit system comprises a hard-wired request-grant wiring, then the advantage is that a very robust and high speed signaling scheme is obtained.

An activity unit may preferably be one of or a group of the following circuit functional elements:

a processor unit, an Arithmetic and Logical Unit (ALU), an adder stage, a multiplier stage, a bus multiplexer stage, a memory array, a switching stage, a clock tree, Input/Output (I/O) driver unit, or an analogue circuit component, in particular a current source. Of course, the composition of a group my be organized such that closely related working units are comprised of one group, which produce e.g., an intermediate result which is further input in a working unit associated with a different group.

An example for a group is an adder plus an adder output comparing stage.

Thus, an easy and robust calculating can be obtained when useful grouping of activity units is done.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

Figure 3:
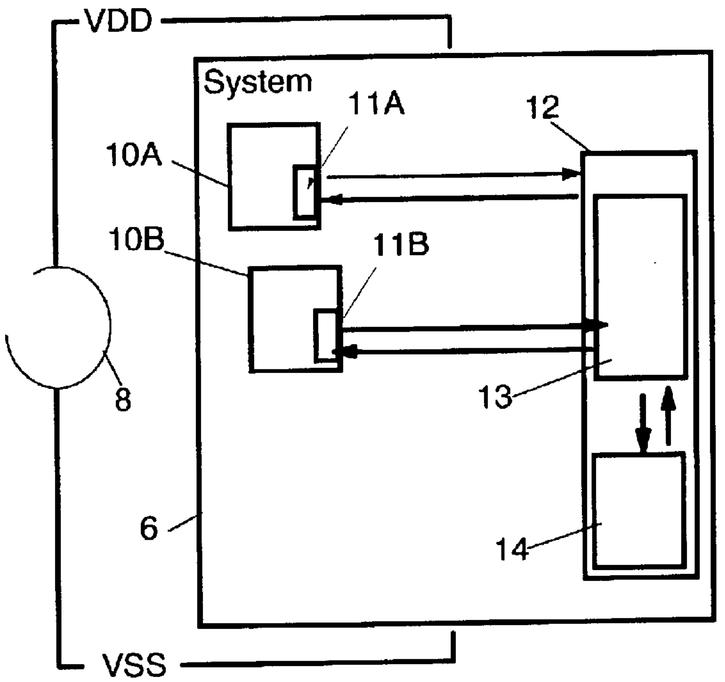
FIG. 3 is a schematic representation illustrating the basic structural elements of the present invention.

With general reference to the figures and with special reference now to FIG. 3 a zoom-view into the logical scheme representation of a prior art chip is given which is improved by the present invention.

A CMOS chip which is depicted in parts only as a digital circuit system 6, has a DC power supply device 8, which is connected between the two DC potential layers VDD at 2 Volts and VSS at 0 Volts, for sake of example only.

Using the current demand from the power supply 8 during operation the CMOS system is split into a plurality of activity units (AU) 10A, 10B, of which only two are depicted for sake of improved clarity of the drawing. Each of said activity units 10 is thus connected to said power supply device 8.

In addition to the activity units 10 there is provided a supervising logic circuit 12 throughout the system (SU) according to this preferred embodiment. This supervisor circuit 12 comprises a central activity monitor 13 and a data base 14 abbreviated herein as SSDB and operatively connected with said activity monitor 13, and containing all critical frequencies f_crit and critical currents fluctuations i_crit to be avoided which was mentioned above. Said critical i_crit were loaded into the database before, as described earlier.

According to the embodiment given here, each activity unit 10A, 10B, etc. is connected to and communicates to a respective control element 11A, 11B, etc.

The operational state of each AU 10 can be active, which implies current demand from the power supply, or inactive, which means no switching activity and therefore implies only a negligible current I demand from the power supply.

According to a preferred aspect of the invention a request/grant signaling scheme is implemented between each control element 11A, 11B and associated activity unit 10A, 10B and the activity monitor 12, respectively.

A preferred control flow of said signaling scheme will be described next as follows:

Before an AU is may change its actual state, it has to send a respective request to the AM. This request issuing task is handled by the associated CE. The AU is forced by the CE to delay its intended state change until the AM grants the respective request. The delay/grant algorithm of the AM is using the critical operation data stored in the above mentioned database 14. Due to the fact that the algorithm is also fed with the actual operation data, i.e., knows about the actual frequencies of delta I-step repetitions (as described above with ref. to FIG. 2) compares between actual operational frequencies and "forbidden" critical frequencies can be done. Such compare processes are performed quite quick, such that the delay/grant algorithm assures that critical activity change frequencies are avoided that the system activity change rate may be kept below a critical limit defined in the database.

This compare and evaluation step is preferably implemented in hard-wired logic. A preferred implementation for the database 14 logic is one in which all possible system state transitions are mapped into an unique address, which is used to access a memory location including at least a "grant/no-grant" bit in a respective storage array. When a number of 10 AUs are present in the system, a need of 10 exp 2=1024 storage locations arises in this specific embodiment. Of course, other implementations are possible.

According to a preferred aspect of the present invention each AU 10 is also able to operate in no-op cycles in order to maintain its active state and current demand from the power supply, and—of course—without destroying the final result of the last functional operation. This is achieved by operating the AU in its respective "neutral" state of operation. This is adding a "0" for an adder stage, or multiplying with a factor of "1" in a multiplier stage, etc.

The status of such dummy operations is preferably entered autonomously by a respective AU in order to guarantee continuous operation having a continuous current demand, until a respective request grant is received in the AU. Thus, each AU 10 is able to delay the transition from its active to its inactive stage, in particular.

Thus, e.g., if the AU is a multiplier stage, which is able to multiply 2 numbers and transfer the result to the output, the inactive state lasts as long as there are no valid inputs available. If both inputs are valid and the multiplier is allowed to operate, it changes to its active state and does the multiplication. The multiplier transfers the final result to the output and, if allowed, changes its state back to inactive. If the state change to inactive is not granted, it continues to multiply the same numbers or dummy numbers, again and again without updating the output until the grant is given. In cases, in which no neutral operation is possible for an activity unit, and the operation is continued although the original, functionally intended result is already present at the output of the AU, a specific control logic Add-On is provided according to the invention which bypasses the output latches holding the correct result values, in order to avoid an overwrite of the correct result.

Figure 4:
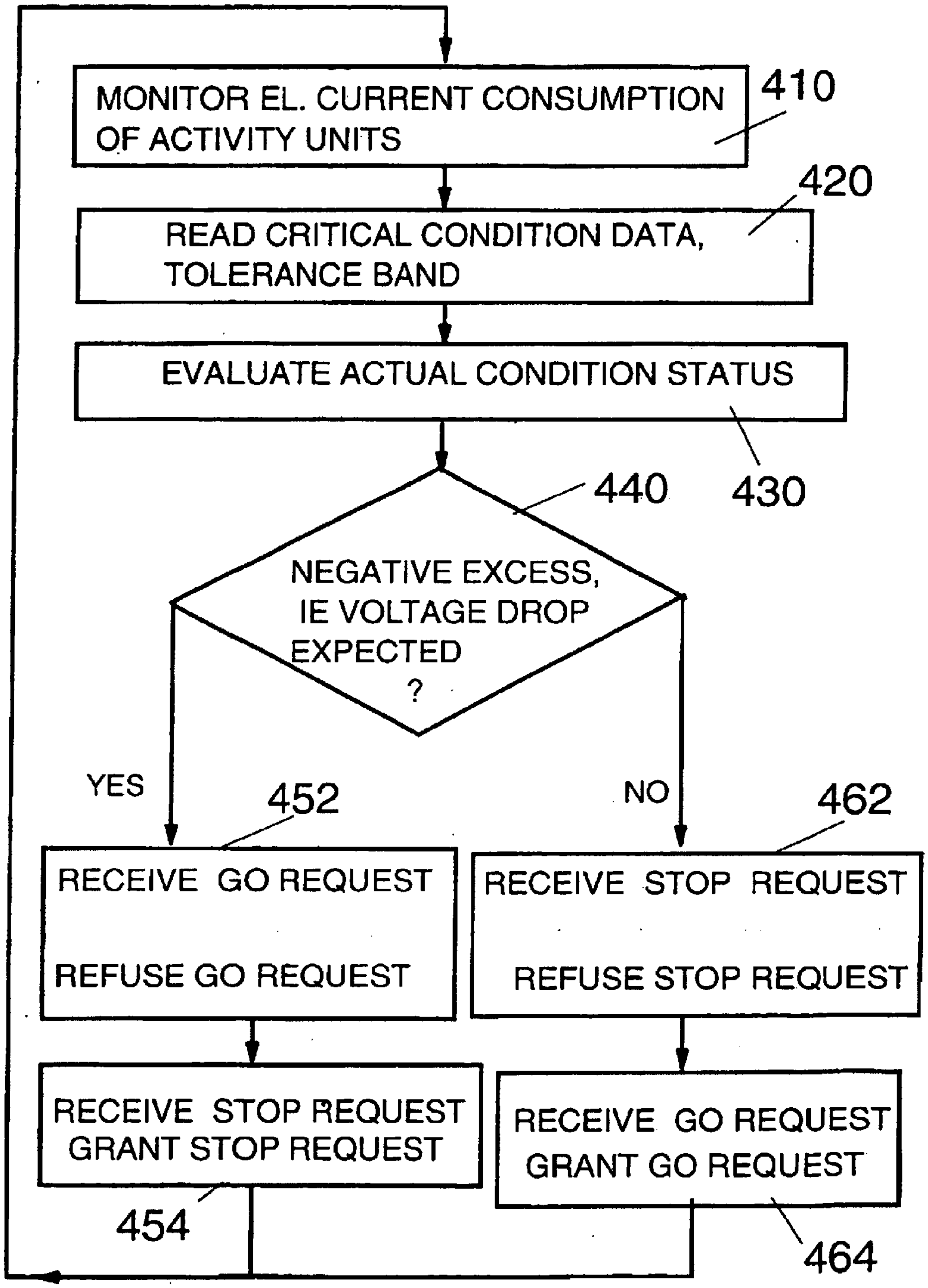
FIG. 4 is a block diagram representation of the control flow of a preferred embodiment of the method.

With reference to FIG. 4, which illustrates the control flow of a preferred embodiment of the method, in a step 410 the electrical current consumption of each AU is monitored, and, by addition of them, the cumulated current consumption is monitored. This is done by tracking, which AU is actually in an active state and by performing a cross-check into the database 14 in order to read its nominal current consumption.

By comparing all actually imminent AU state change requests, and comparing them to the stored critical delta-I value, step 420, it can be determined, if the system operation is in a critical condition, or not. If the tolerance band is exceeded, the critical operation status would be entered, step 430. This shall be avoided by virtue of the invention.

If the evaluation step 430 yields a decision that a negative excess, i.e., an supply voltage drop due to excess current consumption is imminent, i.e. would be reached in the immediate future if the method was not present, then the YES case of decision 440 is entered. In this branch, any AU or at least a sufficiently large number of them should immediately stop work as an supply voltage drop due to "overload" must be avoided. Thus, any incoming "GO-request" issued by any AU which wishes to start operation by this request, is refused, block 452, whereas a contrary request, i.e., a STOP request is immediately granted, as soon as received, block 454.

In the NO-branch of decision 440 the control aim is inverse:

Any AU should immediately begin work as an excess supply voltage rise due to "underload" must be avoided. Respective contrary control actions are undertaken in a block 462 to refuse a STOP request or to grant, block 464, a GO-request, respectively.

Then, it is branched back to step 410, for continuing the permanent control.

It should be understood that the frequency with which the loop 410 to 464 is run through, should be in a reasonable ratio to the maximum expectable sum of supply current change request grants. A modification may thus be implemented in which one loop comprises the sampling of more than one request coming in at decided upon in decision 440.

Figure 5:
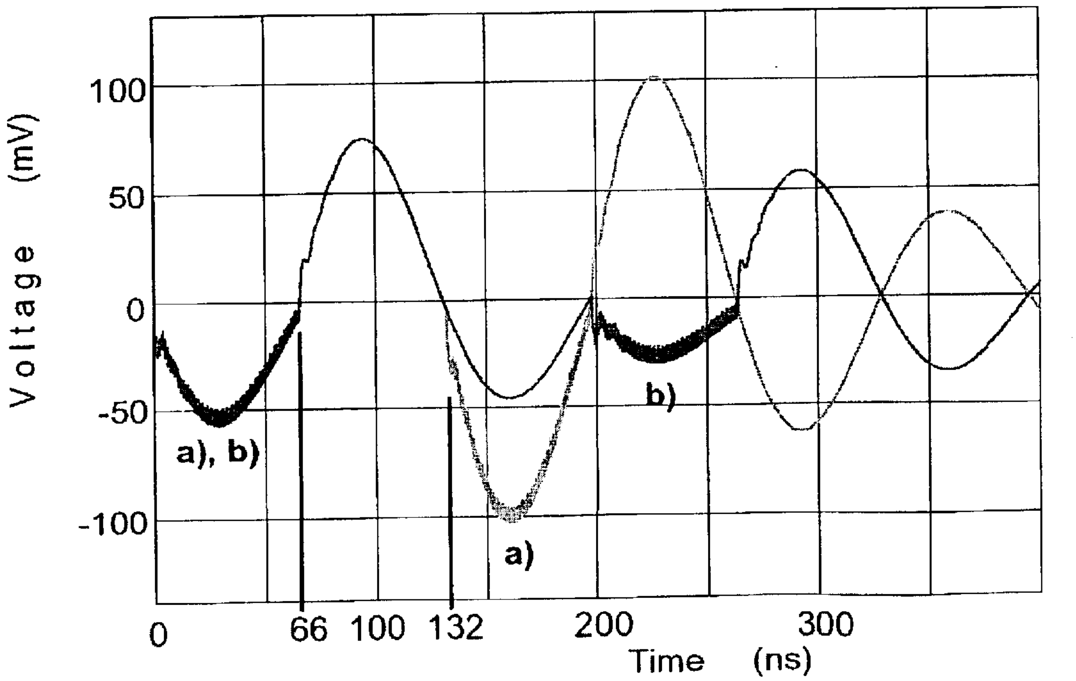
FIG. 5 is a time chart according to FIG. 1, illustrating in a) prior art undamped noise voltage; and b) noise voltage damped according to the present invention.

FIG. 5 shows an example in which the advantageous technical damping effect obtainable by the present invention is clearly visualized.

Two switching periods (1 GHz switching) and two quiet periods are depicted. Curve a) shows a critical case with a first switching period from 0 ns to 66 ns followed by a quiet period for 66 ns, and followed by a second switching period from 132 ns to 198 ns, followed in turn by no switching up to 400 ns.

In FIG. 5, curve b) the second switching period has been delayed according to the invention by 66 ns to the time period starting from 198 ns and ending at 264 ns. The noise after 132 ns is thus significantly reduced, which reveals from the upper line in the 132 to 198 ns interval.

Figure 1:
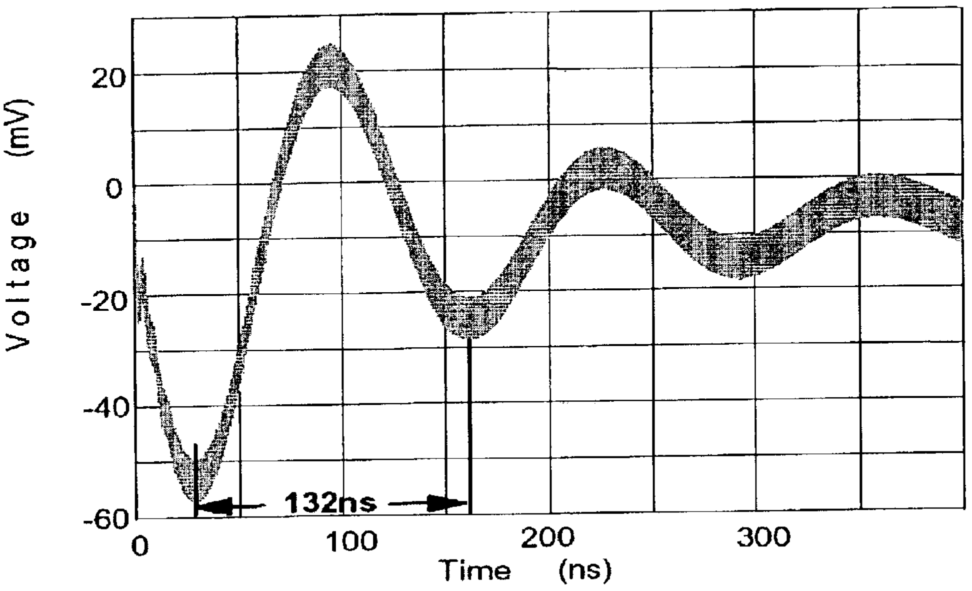
FIG. 1 is a time chart showing noise voltage on a prior art chip, immediately after start of switching operation, at t=0 nanoseconds (ns)
Figure 2:
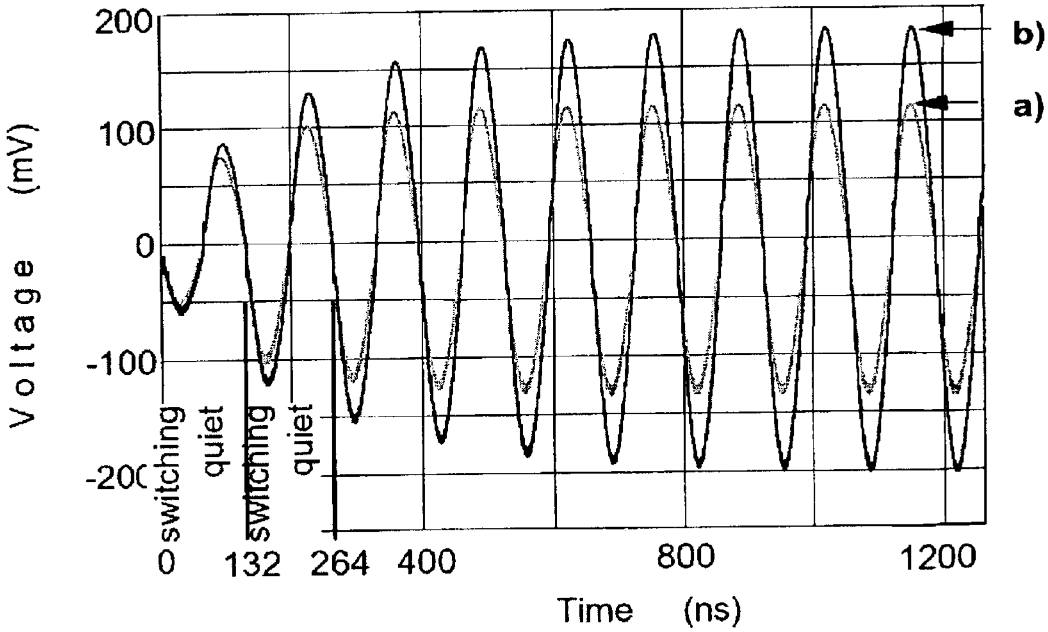
FIG. 2 is a time chart extending until t>1200 nanoseconds, illustrating delta-I repetition frequency of 7.58 MHz, duty cycle of 0.5 in a prior art chip.

Moreover, according to the invention, additional switching (dummy) cycles can be executed to avoid the large noise peak during the first quiet period between 66 ns and 132 ns in either of FIGS. 2 and 5.

The execution of said additional non-switching cycles (duration T/2 which equals 66 ns in the example) does not reduce the system performance significantly, as long as the repetition time for the critical switching condition is large compared with T/2, which is very likely. On the other hand, any probability for the critical switching condition as e.g. 1 per hour, 1 per day or 1 per week is certainly not tolerable, if this causes a system failure.

The monitoring of the switching activity will need some additional circuits on the chips. This is however tolerable in regard to the advantageous delta I-noise reduction obtainable thereby.

The present invention has increasing importance for:

A) Decreasing chip operation voltage, as the power/ground noise is even more critical at low power supply voltages B) Increasing switching (clock) frequencies which increases the power supply current and delta-I noise, C) Increasing power supply currents and larger delta-I steps due to more simultaneously switching circuits which increases delta-I noise, D) Decreasing capacitor and board/card power/ground plane resistance as a consequence of the above items 1–3, which in turn increases the delta-I noise in case of resonance.

The present invention can be realized in hardware, or a combination of hardware and software, i.e., in form of a dedicated microcode-programmed processor. A fast solution, however, is preferably implemented with hard-wired logic on the same chip in which the original functional logic is implemented.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for reducing delta I-noise in a digital circuit system comprised of a plurality of activity units being connected to a power supply voltage, in which method the operation of said digital circuit system may excite high-frequency fluctuations of a total power supply current I, and a respective resulting fluctuation of the power supply voltage, comprising the steps of:

a) maintaining a circuit system-specific catalogue storing a current consumption for each of said activity units in its operational state, b) continuously monitoring a actual current consumption of a total of said activity units, c) determining critical operation conditions potentially to be caused by an immediately imminent delta-I of the supply voltage resulting from an immediately imminent current I excess demand fluctuation, the excess demand being defined relative to a predetermined set tolerance band for the total current I, d) dependent of a quantity of the imminent current I excess demand fluctuation, selecting a subset of said activity units with a respective current I demand for either aa) temporarily delaying their activity in case of an imminent supply voltage drop, or bb) temporarily continuing their activity with a predetermined, activity-specific NO-OP phase in case of an imminent supply voltage rise.

2. The method according to claim 1, further comprising providing a request/grant mechanism between a supervisor means and each of said activity units, the request/grant mechanism comprising the steps of:

a) an activity unit requesting that its operation is required to begin (Go-request), b) granting the request when this is compliant to the predetermined tolerance band, otherwise not granting said request, c) on a successful grant, beginning operation of the activity unit, d) when an activity unit requesting that operation is required to stop (STOP-request), granting a STOP-request when a respective stop of activity operation is compliant to the tolerance band, otherwise not granting said request, e) on a successful grant, stopping the operation of the activity unit.

3. A digital circuit system for reducing delta I-noise comprising:

a plurality of activity units connected to a power supply voltage wherein the operation of said digital circuit system may excite high-frequency fluctuations of a total power supply current I and a respective resulting fluctuation of the power supply voltage, a circuit system-specific catalogue storing a current consumption for each of said activity units in its operational state, a monitor continuously monitoring a actual current consumption of a total of said activity units, a supervisor control circuit determining critical operation conditions potentially to be caused by an immediately imminent delta-I of the supply voltage resulting from an immediately imminent current I excess demand fluctuation, the excess quantity being defined relative to a predetermined set tolerance band for a total current I, and logic which, dependent on a quantity of the imminent current I excess demand fluctuation, selects a subset of said activity units with a respective current I demand for either temporarily delaying their activity in case of an imminent supply voltage drop, or temporarily continuing their activity with a predetermined, activity-specific NO-OP phase in case of an imminent supply voltage rise.

4. The digital circuit system according to claim 3, further comprising:

a request/grant mechanism between said supervisor control circuit and each of said activity units, the request/grant mechanism comprising:

a requesting facility wherein an activity unit requests that its operation is required to begin (Go-request), a granting facility granting the request when this is compliant to the predetermined tolerance band, otherwise not granting said request, wherein on a successful grant, said request/grant mechanism begins operation of the activity unit, when an activity unit requesting that operation is required to stop (STOP-request), said request/grant mechanism grants the STOP-request when the respective stop of activity operation is compliant to the tolerance band, otherwise not granting said request, and on a successful grant, said request/grant mechanism stops the operation of the activity unit.

5. The digital circuit system according to claim 3, in which a) a subset of said activity units comprises a control element for issuing a STOP or GO request and for receiving a respective grant, said grant triggering a begin and stop of operation of said activity units, b) said supervisor control circuit is connected to said control element via respective control signal lines.

6. The digital circuit system according to claim 5 comprising a hard-wired request-grant wiring.

7. The digital circuit system according claim 3 in which an activity unit comprises one or more of the following circuit functional elements:

a processor unit, an Arithmetic and Logical Unit (ALU), an adder stage, a multiplier stage, a bus multiplexer stage, a memory array, a switching stage, a clock tree, an Input/Output (I/O) driver unit, or an analog circuit component, in particular a current source.

8. A computer program product for reducing delta I-noise in a digital circuit system comprised of a plurality of activity units being connected to a power supply voltage, the operation of said digital circuit system may exciting high-frequency fluctuations of a total power supply current I, and a respective resulting fluctuation of the power supply voltage, said computer program product comprising:

a computer readable medium having recorded thereon computer readable program code performing a method comprising:

a) maintaining a circuit system-specific catalogue storing a current consumption for each of said activity units in its operational state, b) continuously monitoring a actual current consumption of a total of said activity units, c) determining critical operation conditions potentially to be caused by an immediately imminent delta-I of a supply voltage resulting from an immediately imminent current I excess demand fluctuation, the excess quantity being defined relative to a predetermined set tolerance band for the total current I, d) dependent of the quantity of the imminent current I excess demand fluctuation, selecting a subset of said activity units with a respective current I demand for either aa) temporarily delaying their activity in case of an imminent supply voltage drop, or bb) temporarily continuing their activity with a predetermined, activity-specific NO-OP phase in case of an imminent supply voltage rise.

9. The computer program product according to claim 8, further comprising computer readable program code providing a request/grant mechanism between a supervisor means and each of said activity units, the request/grant mechanism comprising the steps of:

a) an activity unit requesting that its operation is required to begin (Go-request), b) granting the request when this is compliant to the predetermined tolerance band, otherwise not granting said request, c) on a successful grant, beginning operation of the activity unit, d) when an activity unit requesting that operation is required to stop (STOP-request), granting the STOP-request when the respective stop of activity operation is compliant to the tolerance band, otherwise not granting said request, e) on a successful grant, stopping the operation of the activity unit.

* * * * *